US008544575B1

(12) United States Patent
Scaringe et al.

(10) Patent No.: US 8,544,575 B1
(45) Date of Patent: Oct. 1, 2013

(54) LIGHTWEIGHT INTERNAL COMBUSTION/ELECTRIC HYBRID POWER SOURCE FOR VEHICLES

(75) Inventors: Robert P. Scaringe, Rockledge, FL (US); David Sykes, Midlothian, VA (US); Gregory S. Cole, Melbourne, FL (US); Robert J. Scaringe, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 527 days.

(21) Appl. No.: 12/629,104

(22) Filed: Dec. 2, 2009

(51) Int. Cl.
*B60K 6/20* (2007.10)
*B60K 6/42* (2007.10)

(52) U.S. Cl.
USPC .................................. 180/65.22; 180/65.21

(58) Field of Classification Search
USPC .................. 180/2.1, 2.2, 65.21, 65.22, 65.25, 180/65.26, 65.265, 65.28, 65.285, 65.29; 310/263; 477/3; 903/906, 930, 951
See application file for complete search history.

(56) References Cited

U.S. PATENT DOCUMENTS

| | | | | |
|---|---|---|---|---|
| 5,172,006 A * | 12/1992 | Suzuki et al. | ................... | 290/45 |
| 5,285,111 A * | 2/1994 | Sherman | ................... | 180/65.25 |
| 5,343,970 A | 9/1994 | Severinsky | | |
| 5,575,730 A * | 11/1996 | Edwards et al. | ................... | 475/5 |
| 5,975,227 A * | 11/1999 | Vlad | ................... | 180/65.245 |
| 6,040,634 A * | 3/2000 | Larguier | ................... | 903/906 |
| 6,208,036 B1 * | 3/2001 | Evans et al. | ................... | 180/65.265 |
| 6,209,672 B1 | 4/2001 | Severinsky | | |
| 6,269,895 B1 * | 8/2001 | Tanuguchi et al. | ................... | 180/65.25 |
| 6,297,575 B1 * | 10/2001 | Yang | ................... | 310/266 |
| 6,487,998 B1 * | 12/2002 | Masberg et al. | ................... | 123/192.1 |
| 6,573,626 B1 * | 6/2003 | Gosebruch et al. | ................... | 310/74 |
| 6,879,888 B2 * | 4/2005 | Ochiai et al. | ................... | 180/65.25 |
| 6,936,933 B2 * | 8/2005 | Wilmore | ................... | 290/46 |
| 7,108,095 B1 * | 9/2006 | Washington et al. | ................... | 180/165 |
| 7,210,304 B2 * | 5/2007 | Nagashima | ................... | 62/259.2 |
| 7,211,912 B2 * | 5/2007 | Takenaka et al. | ................... | 310/54 |
| 7,293,621 B2 * | 11/2007 | Long | ................... | 180/165 |
| 7,416,039 B1 * | 8/2008 | Anderson et al. | ................... | 180/165 |
| 7,597,164 B2 * | 10/2009 | Severinsky et al. | ................... | 180/65.27 |
| 7,654,355 B1 * | 2/2010 | Williams | ................... | 180/165 |
| 7,958,960 B2 * | 6/2011 | Mizutani et al. | ................... | 180/65.51 |
| 8,167,062 B2 * | 5/2012 | Wolff et al. | ................... | 180/65.21 |
| 8,167,063 B2 * | 5/2012 | Abe et al. | ................... | 180/65.24 |
| 8,397,845 B2 * | 3/2013 | Yoshida | ................... | 180/65.1 |
| 2004/0112320 A1 * | 6/2004 | Bolz et al. | ................... | 123/179.28 |
| 2005/0109550 A1 * | 5/2005 | Buglione et al. | ................... | 180/65.2 |
| 2007/0227470 A1 * | 10/2007 | Cole et al. | ................... | 123/3 |
| 2009/0221390 A1 | 9/2009 | Houle | | |
| 2009/0275439 A1 | 11/2009 | Kersting | | |

OTHER PUBLICATIONS

Integrated Starter Alternator (ISA), International Rectifier—Automotive, 1995-2009, p. 1.
Valeo and Ricardo Teach for 42-V Diesel Vehicle, Automotive Engineering International Online: Focus on Electronics, http://www.sae.org/automag/electronics/11-2001/index.htm, pp. 1-2.
06P-496 Development of the Hybrid System for the Saturn VUE Hybrid, G. Tamai, et al, General Motors Corporation, Copyright 2006 SAE International, pp. 1-6.

* cited by examiner

*Primary Examiner* — J. Allen Shriver, II
*Assistant Examiner* — James M Dolak

(57) ABSTRACT

A compact and lightweight hybrid vehicle power source employs an integrated engine hybrid electric boost power design that operates on a single battery bank for all electrical functions. An integrated flywheel, cooling fan and a single hybrid electric motor drive, engine starter, electromagnetic regenerative braking device and battery charging alternator are combined. The flywheel alternator/starter/hybrid-drive configuration generates electrical power for battery recharging and parasitic loads, rotates the engine for starting, provides boost power for faster vehicle accelerations, provides regenerative braking for faster decelerations, provides inertia for smooth engine operation, and provides pressurized air for forced convection cooling.

44 Claims, 7 Drawing Sheets

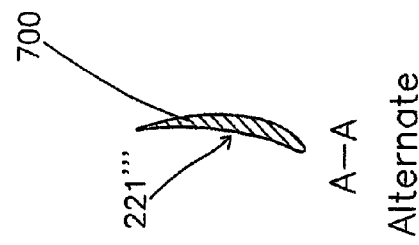
Alternate Figure 7
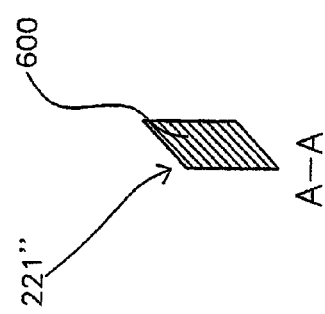
Figure 6
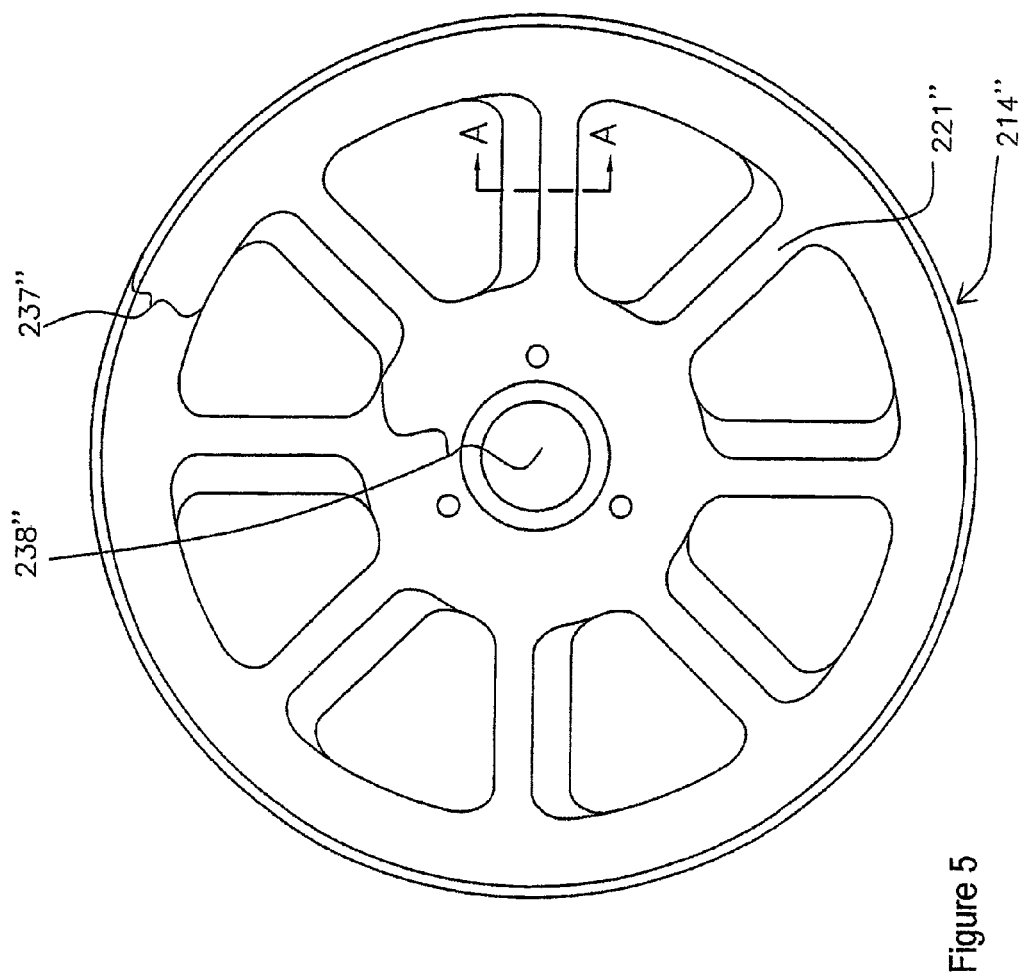
Figure 5

LIGHTWEIGHT INTERNAL COMBUSTION/ELECTRIC HYBRID POWER SOURCE FOR VEHICLES

CROSS-REFERENCE TO RELATED APPLICATION

The present application is related to published U.S. patent application Ser. No. 10/649,793, filed Aug. 28, 2003 (hereinafter also referred to as said published application), the disclosure of which is specifically incorporated herein by reference. We have realized that the technology described in said published application can be advantageously used to achieve hybrid drive power and regenerative braking energy recovery in addition to engine starting and generating power in a vehicle.

BACKGROUND AND SUMMARY OF THE INVENTION

Field of the Invention

More specifically, the present invention relates to an electromagnetic device uniquely integrated with an internal combustion engine to provide size, weight, and reliability improvements of vehicle hybrid power sources. A integrated flywheel starter/alternator/hybrid-drive/regenerative-braking (hereinafter, ISAHDRB) system mounted on an air-cooled or water-cooled internal combustion engine generates electrical power when the engine is operating or the vehicle is braking and can also be used to provide engine rotation for starting or additional power boost to the engine for improved vehicle acceleration.

As a further improvement, both the ISAHDRB device of the present invention and its location are also able to allow the ISAHDRB system to function as the cooling fan to force ambient air over the external portions of the engine, the electronics, the battery bank or to ventilate the engine compartment in both water-cooled or air-cooled engine configurations. For water-cooled configurations (where the internal combustion engine and/or the ISAHDRB stator windings are water cooled), the ISAHDRB system with integrated fan can also serve to force ambient air through the radiator cooling fins or passages. Improvements in the engine design and the functionality of the integrated flywheel-alternator-starter result in a smaller and lighter hybrid vehicle power source as will be evident from the more detailed description below.

Known hybrid power systems are typically comprised of an internal combustion engine coupled mechanically to a hybrid drive system located between the engine and the vehicle transmission. The actual location is usually physically attached to the output shaft of the engine or to the input shaft of the transmission, or is incorporated into the transmission. Such hybrid power systems may still have both an engine starter and battery-charging alternator on the internal combustion engine or they may use the hybrid drive for starting. When a separate starter is used, the starter typically engages gear-teeth on the outside circumference of the flywheel, and the battery charging alternator is driven by a drive belt. The engine's flywheel uses inertia to reduce shaft speed fluctuations that are created by the cyclical torque impulses of reciprocating machines. In one known configuration, the hybrid drive motor is mounted inside the vehicle transmission. More commonly it is mounted between the engine and the transmission, on a frame common with the engine or the transmission.

In conventional vehicle engines electric starting is provided by an electric starter motor which, as noted above, is usually mounted to the external surface of the engine and temporarily engages with gear-teeth on the flywheel during the starting operation or mode. Typically, the end of the electric starter motor connects to a retractable pinion gear which engages teeth on the engine flywheel, during motor starting to crank the engine. This pinion gear retracts (disengages) the teeth on the flywheel after the engine starts. Other methods to engage and disengage the starter motor from the engine after starting are also well known in the art.

In addition, as previously noted, an alternator for recharging the engine's starter motor battery is coupled to the engine via a drive belt. Other auxiliary devices such as water pump, air conditioning compressor and power steering unit may also be powered from this or additional drive-belt drive arrangements.

The conventional dedicated starter motor mounted on the engine and temporarily coupled to the engine through gear teeth (ring gear) on the flywheel is bulky and heavy due to lack of weight optimization and integration. Failure of the starter motor to engage or disengage, as well as gear wear, can reduce the reliability of this type of system. Likewise, the conventional belt-driven alternator for battery recharging is also bulky and heavy, and results in yet another maintenance issue, thereby increasing maintenance costs and decreasing reliability.

As a specific example, General Motors cars use what is referred to as a "Mild-Hybrid" system (as described in SAE Paper 06P-496) which includes a modified 4-speed automatic transmission and a separate externally mounted starter motor which engages/disengages a ring gear on the flywheel. An example of that type of hybrid is the 2007 Saturn VUE Green Line Hybrid SUV.

The concept of using the alternator as the engine starter has been explored for the automotive industry to reduce costs by reducing the components (http://www.irf.com/product-info/auto/isaapp.html, http://www.sae.org/automag/electronics/11-2001/). The necessary circuitry to provide switching to allow the single device to be powered as a starter motor until engine starting has been detected and then switching to alternator is also known.

One hybrid power approach (Saturn Vue Hybrid, See SAE paper 06P-496 also http://www.hybridcars.com/suvs-mini-vans/saturn-vue-green-line.html) has been to replace the existing alternator and drive belt with a dual-action drive belt and employ a combined hybrid starter alternator power source which supplies power to the engine for motor starting or hybrid drive power or draws power from the engine for battery recharging.

In other proposed configurations, a hybrid drive motor is typically placed between the engine output shaft and the transmission input shaft (or directly into the transmission as disclosed in published patent applications Nos. 2009-0275439 and 2009-0221390), to provide the hybrid electric power source. This location does not alleviate the need for a separate engine cooling fan and a separate engine flywheel. Prior designs have also utilized a conventional starter motor, a conventional battery recharging alternator, and a separate battery for motor starting (in addition to the hybrid power source battery bank—typically operating a two different voltages).

SUMMARY OF THE INVENTION

An object of the present invention is to reduce the size, weight and complexity of the hybrid vehicle drive system through function integration to increase system reliability, specifically by reducing the number of components of the hybrid vehicle drive system by combining the functions of radiator and/or engine cooling, engine starting, starter battery recharging, hybrid-drive power, and regenerative braking into a single device integrated with the engine flywheel and advantageously using the mass of the flywheel for additional purposes, other than just supplying an inertial mass.

Another object of the present invention is to utilize a single power source/sink, comprised of one or more batteries and ultra capacitors configured as a single battery bank, for the power functions for motor starting, hybrid motor drive, energy storage for regenerative braking, energy storage for battery recharging and power for parasitic power supply.

Yet other objects of the present invention are to increase reliability of the hybrid vehicle drive system through the elimination of the engaging/disengaging starting system which temporarily engages a start mode gear teeth with gear teeth on the flywheel so as to rotate the engine for starting, as well as through the elimination of drive belts on the engine while, at the same time, to reduce the maintenance of a hybrid vehicle drive system through the elimination of any kind of drive belts that require periodic replacement.

Whereas in-line hybrid drives have traditionally been placed between the engine output shaft and the transmission as has been for the flywheel, with a cooling fan located on the other end of the engine, our invention places the hybrid-drive and the flywheel together on the cooling fan side of the engine and not on the transmission end of the engine. We have recognized this as a more accessible location as well as a better and easier way to cool the electrical windings and magnets of the ISAHDRB system. Any device that converts electric power to shaft work or shaft work to electric power has irreversibilities, as dictated by the second law of thermodynamics, and therefore these devices have to reject heat to the ambient. Placing the ISAHDRB on the cooling fan side (and not the transmission-side) of the engine allows the ISAHDRB to also serve as the cooling fan to cool the engine and/or the radiator of a water cooled engine as well as the flywheel. While some modern engines have electric cooling fans that are not mounted directly to the engine shaft to use rotational power, here we are referring to the cooling fan end of the engine as the end that is not located at the transmission side (ends of the engine refer to the two sides of the engine from which the crankshaft ends extend).

In addition to the improved cooling and the benefit of greater accessibility, our configuration allows for the use of various ISAHDRB units of different capacities, without the need to change the engine, the transmission or the coupling between the engine and transmission. For example, as battery or ultra-capacitor technology improves either in reducing cost or increasing capacity, the ISAHDRB system electrical energy storage capacity (via a single battery bank using a combination of batteries and ultra-capacitors) could be increased to better utilize these improvements. The increased capacity of the ISAHDRB could be used to power the wheels of the vehicle through the engine and transmission 910 (FIG. 10.) or this additional power could be used to power electric motors 920 (FIG. 10.) in the otherwise un-driven wheels of the vehicle as well as providing regenerative braking in these wheels via the electric motors. Likewise, if sportier vehicle, with increased hybrid drive acceleration, was desired only the ISAHDRB assembly would need to be changed without any other changes to the engine or transmission. This is contrary to the inline hybrid drive approach, where changing the hybrid drive size would require changes to the transmission-engine connection, because in the traditional configuration the hybrid drive is located between these two components.

The approach being used here, however, has extended this capability in an unexpected manner so that, in addition to the combination of starting and alternator battery recharging of the starter motor battery, the permanent magnet electromotive device integrated into and around the flywheel is also the cooling fan, the inertial mass of the flywheel, the hybrid electric drive motor and the regenerative braking energy recovery device.

The greatest potential for weight savings, improved accessibility, improved cooling, and elimination of starter motor engagement and alternator drive belts is to configure the alternator, starter, hybrid-drive-and-regenerative-braking unit and the cooling fan as a single device which is an integral component of the engine, with the rotating component being an integral part of the flywheel (the rotor) and providing significant inertial mass to the flywheel, and the stationary component (the stator) being attached to the region near the rotating fan flywheel. That is, the combined system is an integrated unit, not the coupling of individual units. Further weight, size, cost and reliability savings are possible by incorporating the forced air cooling fan into the flywheel. Still further weight, size, cost and reliability savings are possible by utilizing a single battery bank for all the electrical functions required.

The present invention further includes the concept of configuring a single power source/sink comprised of one of more batteries and ultra capacitors (also referred to as a single battery bank) as the power source used for starting the engine, hybrid electric drive motor operation, and supplying power for parasitic loads to be the same battery bank used as a power sink for regenerative braking energy storage, and alternator output energy storage.

By utilizing a single battery source, all battery power on the vehicle is available to the hybrid electric motor rather than have a separate starting battery that is only lightly used, while the batteries used for the hybrid motor power are excessively worked. The use of a common battery power source assures the smallest battery size and weight for a given application, since all batteries are used to their fullest extent. This novel approach also allows other renewable energy sources such as inertial energy recovery devices, and solar cells to be easily connected to the single battery bank, and to provide power to recharge this battery bank or to provide hybrid drive power to the vehicle. Wind conversion devices can also be coupled to the system if the vehicle is stationary for the same purpose of recharging the single battery bank.

One aspect of our invention that locates the combined hybrid drive system on the cooling fan side of the engine (the side of the engine opposite the transmission end) and incorporates the inertial flywheel and the cooling fan into the hybrid drive system instead of locating the hybrid drive system on the transmission side of the engine not only allows our combined ISAHDRB system to also function as a cooling fan, but also simplifies cooling of and access to the ISAHDRB system, cooling of the control electronics and other vehicle components while still reducing weight.

Our approach differs from conventional approaches in that, among other things, (1) all power producing and power consuming components (which must be sized for the same operating voltage) are all located in parallel circuits sharing common terminals with the battery bank, (2) a current sensor between the ISAHDRB and the battery bank as well as the vehicle's engine throttle setting are used to determine optimum engine throttle setting, (3) the current sensor between the ISAHDRB and the battery bank as well as a voltage sensor across the battery bank terminals (and knowledge of the type of battery being recharged) are all used to determine when to terminate battery recharging, and (4) a voltage measurement across the battery bank terminals and/or current measurement (current into the battery), is used to determine when to recharge the battery bank.

In our invention, the cooling fan blade is incorporated into the ISAHDRB and also serves to mechanically connect functions of the flywheel. The fan blades connect the hub of the rotating device with the inertial-electromagnetic components which are located at radially outward locations of the flywheel as described in said published application Ser. No. 10/649,793. We have found that the greatest practical radial outward location can increase the inertial effect of the mass of these components and provide the available perimeter of the device (to provide additional space) for locating the critical electromagnetic components (namely the magnets and magnetic material sized to carry the necessary magnetic flux as described in patent application No. 2007/0227470 necessary to generate the magnetic field. The remainder of the integrated electromagnetic device (referred to herein as the stator) is located in close proximity to the flywheel or rotor and is stationary.

Essential control and conversion electronics can be located on the hybrid drive or engine cowling, in the vehicles' engine compartment or other convenient location in the vehicle, and can even be incorporated into the engine control module which controls other functions of the vehicle. Cooling air created by the ISAHDRB assembly can be used to cool these electronics or any other devices in the vehicle.

Another unique result of our invention is that the need for any drive belts or starter drive engagement on the hybrid engine configuration is eliminated. In the ISAHDRB configuration of our invention, other devices such as air conditioning, power steering, fuel pumping which are traditionally driven by power take off drive belts on the engine can be removed, and electrically powered motors can be used for those devices. In addition, to increase torque output and/or reduced hybrid battery power size and weight, these electrically powered devices can be shut off during periods of high acceleration. Use of an electric air conditioner also allows the use of a hermetic compressor and solid metal piping, dramatically reducing service intervals, and preventing the escape of damaging global warming refrigerants into the atmosphere.

The internal combustion engine and the ISAHDRB according to the present invention form an integrated unit. Circuitry is used so that the ISAHDRB can function as a motor starter and then switch to an alternator function once the engine starting has been completed. This circuitry also allows the ISAHDRB to act as an additional power source for acceleration and as a regenerative braking system during deceleration. Since the entire winding of the alternator is used during starting, the starting torque capability is much greater and the starting action can be operated indefinitely without any concern of overheating as is common with a conventional starter motor. Also there is no life-limiting or maintenance concerns related to the starter pinion gear being stuck when engaged or disengaged or any wear associated with the mating pinion and ring gears. The overall parts count and therefore the cost of manufacture and the weight of the system are also greatly reduced.

The internal combustion engine in the currently preferred embodiment is of the compression ignition type, although it will be apparent to those skilled in the art that the present invention also applies to spark ignition type engines.

Therefore, in light of the above-discussed benefits and advantages of an integrated, lightweight, ISAHDRB, as well as the aforementioned shortcomings in the prior art, our invention achieves among other things, the following:

integration of the hybrid power, regenerative braking, generator alternator (for recharging the battery bank) and starting functions into the engine flywheel to eliminate excessive components with weight reduction and improved reliability;

use of integrated ISAHDRB-flywheel as the cooling fan and location of the unitary flywheel-fan-ISAHDRB on the opposite end of the engine from the transmission;

integration of the hybrid power, regenerative braking (for recharging during braking), generator alternator (for recharging the battery bank) and starting functions into the engine flywheel and use of separate distinct or combined electric drive motors for other parasitic loads like air conditioning, fuel pumping and power steering, thereby eliminating the need for drive belts or starting system engagement mechanisms;

integration of the battery used for engine starting with the batteries used by the hybrid power system for acceleration and regenerative braking into a single battery bank using the same batteries (and ultra-capacitors) for all vehicle power functions;

reduction of speed fluctuations, while providing a way to cool both the electrical and mechanical components, generate electrical power, and provide additional power to the transmission for improved vehicle acceleration and electrical braking for energy recovery and improved braking;

use of the stator windings and rotating magnets and magnetic material of the flywheel to serve as both the power generation (and regenerative braking) and augmentation of the engine output power when the engine is operating and the engine starting motor function during the starting of the engine;

providing an electrical connection arrangement where the starting power source, auxiliary power source (for lights, air conditioning, power steering, radio and other parasitic devices), power source for the hybrid drive power (also used during acceleration) and power storage for regenerative braking all utilize the same battery or battery bank;

providing an electrical connection arrangement where the singular battery bank is disconnected from parasitic power drains (such as air conditioning) during short periods of acceleration, to deliver full battery capacity to the hybrid drive thereby maximizing the acceleration time period or minimizing the necessary minimum size and weight of the battery bank; and providing an improved multi-function ISAHDRB or engine cowling that not only gives protection from and to the rotating components but, also serves as a fan shroud, a fan scroll (or volute), a coolant distributor (to cool one or more internal engine components, electromagnetic components, battery bank, electronics, and engine oil), an electronic cold plate (for mounting and cooling ac-to-dc power conversion electronics during power generation, dc-to-ac power conversion electronics during motor starting, voltage regulation electronics, current regulation electronics, and/or control electronics), and a coolant duct.

BRIEF DESCRIPTION OF THE DRAWINGS

Other objects, advantages and novel features of the present invention will become apparent from the following detailed description when considered in conjunction with the accompanying drawings herein.

FIG. 5 from the referenced patent application is a front perspective view of the flywheel ISAHDRB with an integral axial-type cooling fan.

FIG. 6 from the referenced patent application is a cross-sectional view of a constant angle blade for axial-type fans.

FIG. 7 from the referenced patent application is a cross-sectional view of an airfoil blade for axial-type fans.

DETAILED DESCRIPTION OF THE INVENTION

Figure 1:
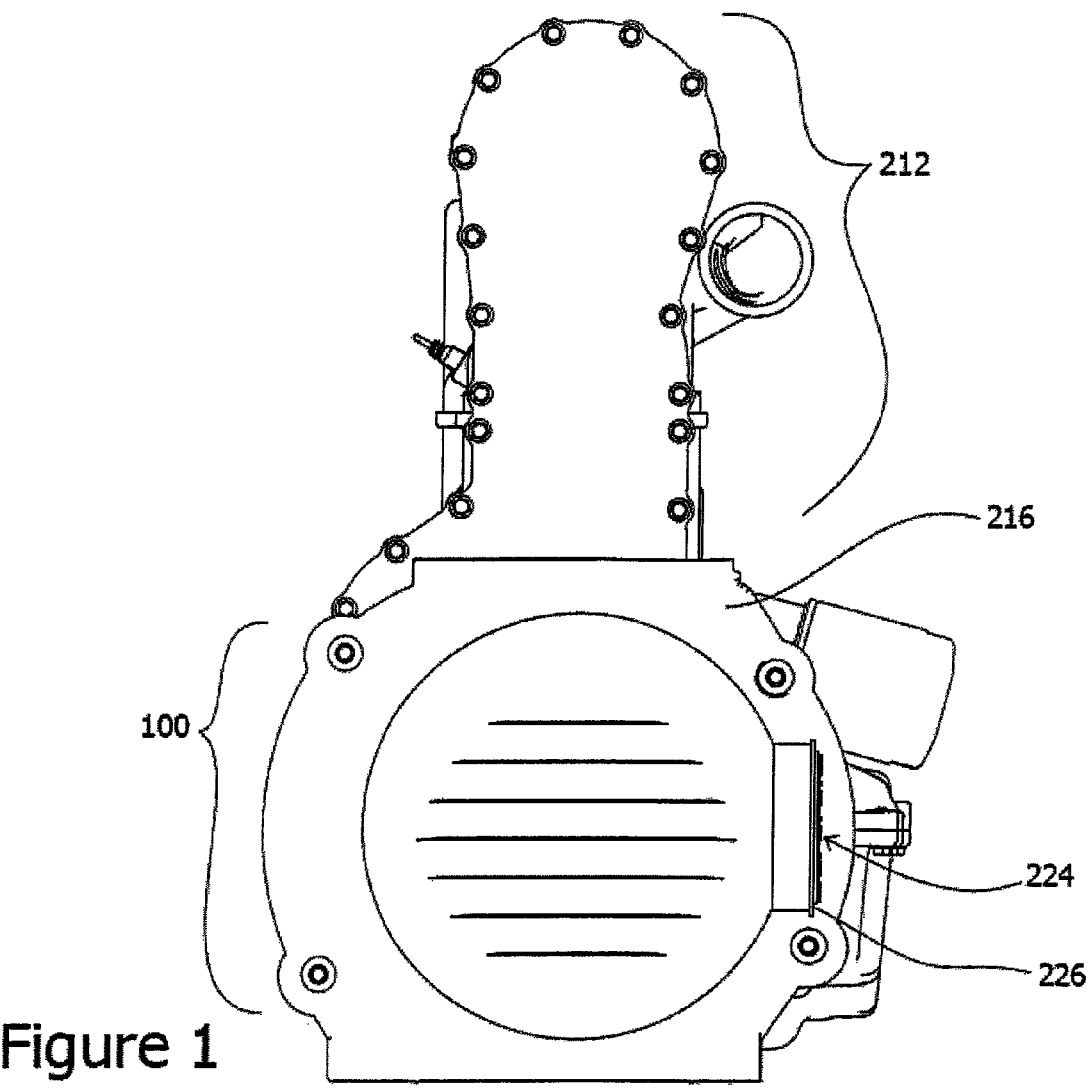
FIG. 1 is an end elevational view of the currently preferred embodiment of the ISAHDRB in accordance with the present invention.
Figure 2:
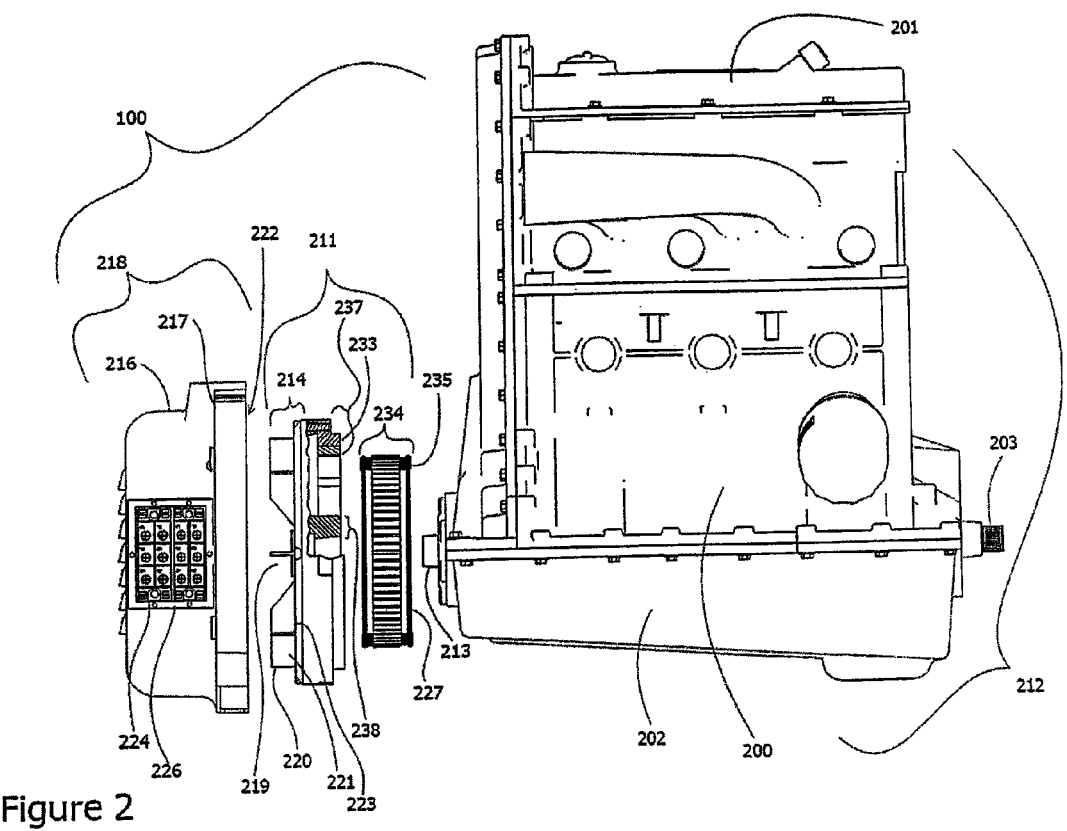
FIG. 2 is a partially exploded side elevational view of the flywheel ISAHDRB of FIG. 1.

Generally speaking, the present invention relates to an ISAHDRB comprised of a two-piece (one rotating, one stationary) device which is a combined engine starter, battery bank charger (alternator), hybrid vehicle drive, and regenerative braking electromagnetic load and which is integrated into the rotating flywheel and adjacent non-rotating area of the internal combustion engine. The internal combustion engine and the ISAHDRB form an integrated unit, and the ISAHDRB and the transmission are the only driven mechanisms of the engine. In a currently preferred embodiment, the transmission and ISAHDRB are located (as illustrated in FIG. 2) on opposite sides of the engine, and the ISAHDRB assembly also acts as the cooling fan for forcing air over the engine and through the radiator of a water-cooled configuration. The ISAHDRB is the only electrical start mechanism on the engine. The engine can, of course, be equipped with a geared starter motor attached to the flywheel if desired. The internal combustion engine in the hereinafter-described currently preferred embodiment is of the compression ignition type, although it will be apparent to anyone skilled in the art that the present invention also applies to spark ignition type engines. The following terms are defined in a way considered to be consistent with terminology in the art to assist with the description of the invention as used the context of the present invention:

(i) An internal combustion engine (or engine) is a device that generates mechanical power through fuel combustion, compression-ignition engines and spark-ignition engines being specific types of engines;

(ii) An alternator is a device that converts mechanical power into alternating electrical power through the use of electromagnetic fields; a permanent magnet alternator being a type of alternator wherein the magnetic field is generated by permanent magnets;

(iii) An electric-powered engine starter is a device which will use electrical power to crank the engine until it starts, a permanent magnet starter motor being a type of electric-powered engine starter wherein an alternating electric field generated by the alternating current (AC) in the stator causes the permanent magnets attached to the rotor to rotate;

(iv) A flywheel is a device that provides inertia to a rotating machine, and in the context of this invention, the inertia is provided to reduce speed fluctuations and vibration of the engine;

(v) A cooling fan or fan is a device that provides forced air flow to cool the engine, the oil, the ISAHDRB, and the radiator of a water-cooled internal combustion engine, and can also be used to ventilate the engine compartment;

(vi) A hybrid drive is an electric motor drive that provides rotating power to the wheels in addition to the internal combustion engine power;

(vii) Regenerative braking is an electromagnetic device that provides a mechanical-to-electrical conversion to create a load on the rolling elements of the vehicle to stop or slow down the vehicle, while returning this power to a storage device or electrical load, such as the battery bank, a parasitic device or other electrical device in the vehicle;

(viii) A flywheel ISAHDRB is described in said published Application incorporated herein by reference, wherein the functions of the alternator, the electric-powered engine starter, the hybrid drive, the regenerative braking, the cooling fan and the flywheel are composed of parts 214, 220, 221, 223, 233, 237 and 238 (FIG. 2) that are combined in a single rotating component (also referred to as the rotor of the flywheel assembly 211) and adjacent non-rotating component 227 in close proximity to the rotating component, the stationary and rotating components not being connected by any mechanical device;

(ix) An electric generator (or generator) is a device that creates electrical power from mechanical power;

(x) An engine cowling or cowling is a component that provides a partial or complete hybrid drive system or engine cover, and in the context of the present invention, is comprised of at least one component that provides multiple functions;

(xi) A hybrid drive system is the ISAHDRB system combined with the internal combustion engine as shown in FIGS. 1 and 2 which show the ISAHDRB designated generally by numeral 100 located at one end of the engine designated by numeral 212, which end in the illustrated embodiment is opposite the transmission side of the engine.

(xii) A fan hub, as used in this disclosure, is the section of the rotating flywheel that connects the center mounting portion of the flywheel (for mounting to the shaft) with the outer inertial and magnetic portion of the flywheel and this hub may be configured from multiple spokes or a single solid spoke.

(xiii) A battery bank is one or more batteries or ultracapacitors configured as a single source and sink of electrical power.

(xiv) A cooling fan end of the engine as used in this discussion is the end of the engine opposite (180 degrees from) the transmission end of the engine.

Referring to FIG. 2, the engine 212 includes engine block 200, oil pan 202 and engine head 201, all fabricated from a lightweight alloy. A portion of the engine block 200 contains one or more cylinder walls of a generally well known construction. A cylinder liner, preferably made of a high temperature metal such as cast iron, is either cast in place, press fit, or shrunk fit into each cylinder bore, and can also be fabricated by utilizing one or more commonly known commercial surface treatments to harden the cylinder surface. The ISAHDRB 100 contains a flywheel alternator assembly (also referred to as a flywheel assembly) designated generally by numeral 211 that performs multiple functions, namely (a) creating airflow for cooling the engine and an electronics assembly 224 mounted to the shroud 216 as well as also to potentially force cooling air over the engine or through the radiator (of a water cooled engine) or an oil cooling heat exchanger, (b) inertia for the engine 212, (c) electrical motor shaft power for engine starting, (d) hybrid drive power (in conjunction with the internal combustion engine), and (e) regenerative electromagnetic braking in conjunction with mechanical braking.

Separate batteries for motor starting and hybrid drive are not needed because the ISAHDRB control system includes electric power management for managing the electric power that is drawn from the battery bank to provide engine starting, electrical power for parasitic loads, and electric power for hybrid engine drive. Electric power management also includes managing the electric power in the single battery bank during regenerative braking and when engine generated power exceeds vehicle propulsion loads and the maximum capacity of the batteries has not been reached. Electric power management further includes managing the internal combustion power output level when the maximum engine generated power exceeds vehicle propulsion loads and parasitic loads and the maximum capacity of the batteries has not been reached.

For air cooled or combined air and liquid cooled configurations, the flywheel assembly 211, along with the engine cowling 218, also provides forced air cooling for the internal-combustion engine 212, forced air cooling for the hybrid drive/alternator/starter/regenerative-braking stator windings 234, and forced air cooling for the control electronics 224. The air cooled electronics 224 are typically mounted to a cold plate or heat sink and housed in an electronics box 226 mounted to the cowling 218 covering the ISAHDRB. The electronics box 226 may be mounted on the engine cowling 218 or another location under the hood of the vehicle in the air flow generated by the flywheel fan 214, which is also integral to the flywheel assembly 211.

Figure 3:
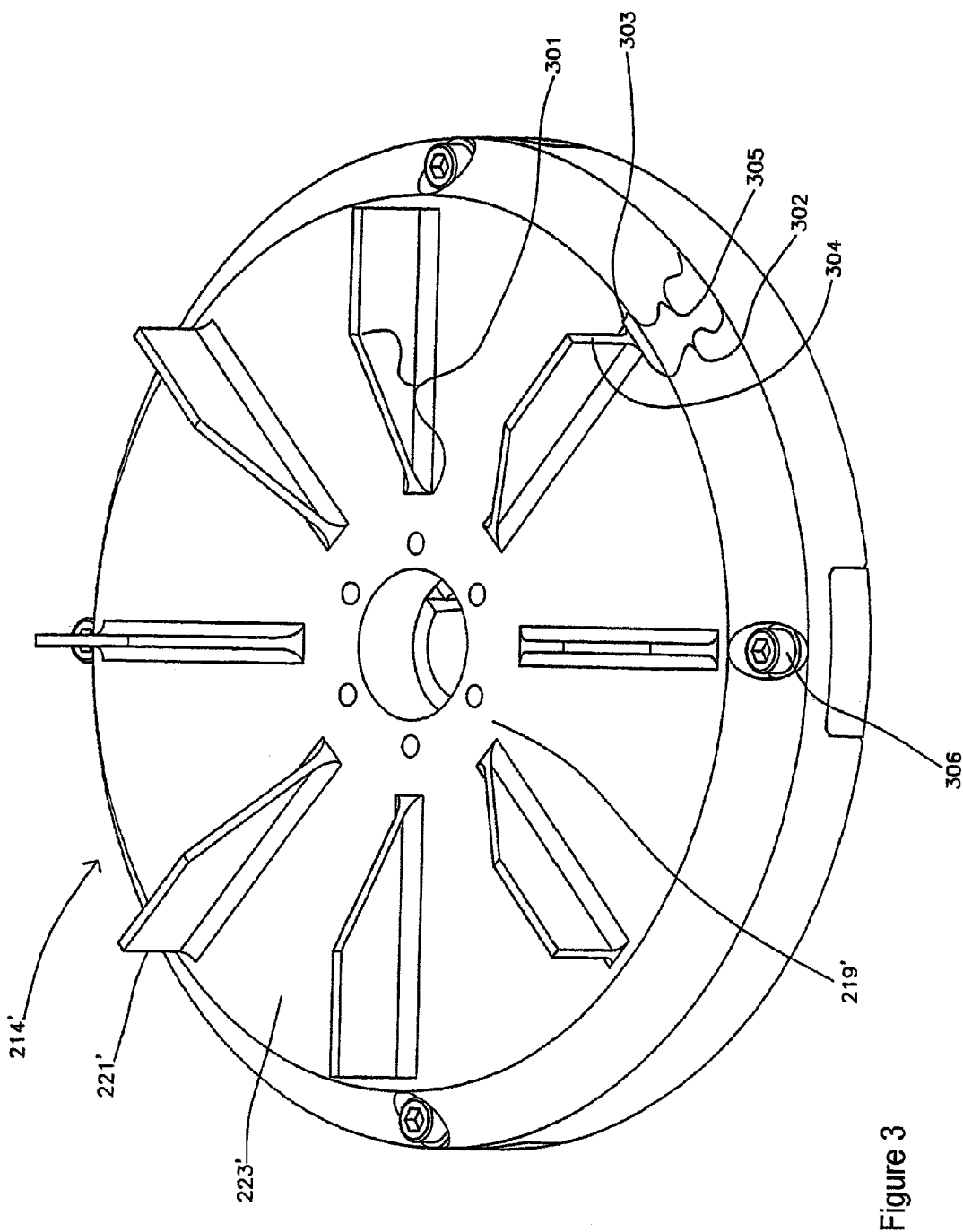
FIG. 3 is a rear perspective view of the flywheel of the ISAHDRB with an integral centrifugal-type cooling fan.
Figure 4:
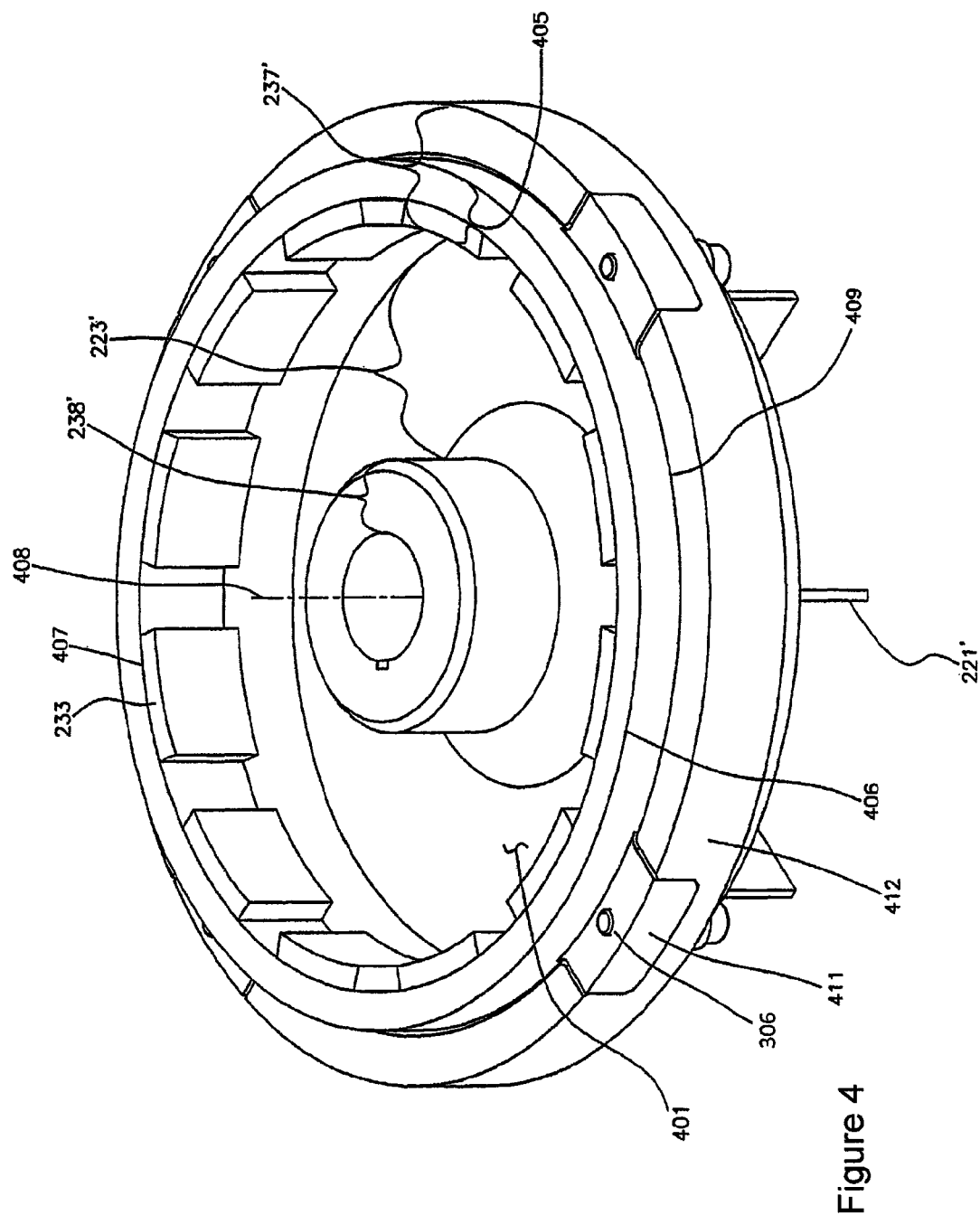
FIG. 4 is a front perspective view of the flywheel of the ISAHDRB with an integral centrifugal-type cooling fan as shown in FIG. 3.

Cyclical combustion of reciprocating-type internal combustion engines creates torque pulsations that would result in crankshaft speed fluctuations if the crankshaft 213 were not restrained. The rotor of the flywheel assembly 211 with cooling fan provides an inertial mechanism for reducing the speed fluctuations and engine vibration. The required inertial mass of the flywheel is used advantageously to also serve as the combined ISAHDRB and cooling fan. No additional inertia mechanism beyond the rotor of the flywheel assembly 211 in the ISAHDRB with integral cooling fan is required for the internal combustion engine. The fan 214 cools the ISAHDRB 100 as well as external portions of the internal combustion engine, can be used to force air through the radiator and oil cooler, over the engine and to ventilate the engine compartment. The fan can be of the centrifugal-, axial-, of mixed flow-type as will be apparent to the those skilled in the art. Referring to FIGS. 3 and 4 of said published Application incorporated by reference herein, the centrifugal-type fan 214' (corresponding to fan 214 in FIG. 2 of this application) has fan blades 221' that provide the function of providing forced air cooling for the ISAHDRB 100 as well as connecting the rotating center portion connected to the engine crankshaft with the outer magnetic and magnetic materials that are serving as the inertial and electromagnetic component. The fan hub 223' provides the mechanical connection of the inertia portion 237' of the flywheel to the mounting portion 238' of the flywheel and can act as a single solid spoke or multiple spokes or cooling fan blades. The inertial portion of the flywheel contains the magnets and associated magnetic material sized to carry the necessary magnetic flux. If the fan blade/fan hub assembly or impeller is shrouded, the impeller shroud may also act as a way of attaching the principle inertia portion of the flywheel to the mounting portion of the flywheel. The impeller shroud can be used to either decrease the stress in the spoked hub or decrease the cross-sectional area of the spoked hub 223'. Openings (not shown) may be formed into the fan hub 223' to increase airflow to the backside of the hub 401 for cooling generator components. The additional openings increase the number of spokes on the fan hub 223'.

In the axial-type fan 214" shown in FIGS. 5-7, the fan blades 221" perform two functions. The first function is to impart momentum to the flow, thereby forcing air through the engine cowling to cool the ISAHDRB. The cross-sectional area 600 of the fan blades 221" can be of the simple constant angle type (FIG. 6) for ease of manufacturing or for the fan blades 221''' of the airfoil type 700 (FIG. 7) for optimum efficiency. The second function is to provide a mechanical linking of the inertia portion of the flywheel 237" to the mounting portion of the flywheel 238". In this sense, the fan blades 221" also act as flywheel spokes. Mixed flow-type fans can also be employed.

The fan not only generates the flow necessary for cooling the ISAHDRB, cooling the engine, and ventilating the engine compartment, but also mechanically fastens the inertia portion of the flywheel to the mounting portion of the flywheel. It should be clear to anyone skilled in the art that the entire fan acts to provide inertia. Reference is made to the inertia portion 237 of the fan only to indicate that due to the relatively large amount of mass at the largest diameter that this section of the flywheel typically provides more inertia than the fan blades 221, fan hub 223, fan shroud (if employed), and mounting portion 238 of the flywheel.

Both the internal combustion engine 212 shown in FIGS. 1 and 2, and electric power generation and load components must be cooled. They can be liquid cooled, using an antifreeze solution or other heat transfer fluid in combination with a pump and radiator as is well known in the art or the unit can be air cooled. The unit can also utilize a combination of air and liquid cooling. When air cooling is utilized, either in whole or part, the fan 214 in FIG. 2 draws air through inlet opening 215 of the fan shroud 216. The fan shroud 216 and the shroud mounting portion 217 are integral to the engine cowling designated generally by numeral 218. The fan 214 moves the air from the low-pressure side fan inlet 219 of the flywheel assembly 211 to the exit of that assembly to increase the air pressure. In the currently preferred embodiment, a centrifugal fan 214' of the type shown in FIGS. 3 and 4 as described above is used. Air enters the low-pressure side fan inlet 219' primarily in an axial direction. The fan impeller blades 221' impart momentum to the air, moving the air centrifugally outward and increasing the stagnation pressure of the air. The fan impeller blades 221' may be curved for optimum efficiency or radial for ease of manufacturing. In a currently preferred embodiment, eight fan blades 221', each with a total blade length equal to 2.525 inches and a blade thickness equal to 0.100 inches are employed. The blade inlet 301 begins at a radial distance 1.350 inches from the fan axis and tapers to a height of 0.830 inches at a radial distance 2.750 inches from the fan axis. A diffuser 302 either of the vaned or vaneless type is located concentrically with respect to the fan impeller. The diffuser 302 converts some of the air stagnation pressure to static pressure prior to entering the fan scroll 222 or volute. As the air is collected in the scroll 222, more of the stagnation pressure is converted to static pressure. The scroll 222 shown in FIG. 2 is also integral to the engine cowling 218. In the illustrated embodiment of FIGS. 3 and 4, a straight vaneless diffuser region 303 extends 0.438 inches radially from the end of the blades 304. A tapered vaneless diffuser region 305 extends another 0.250 inches radially beyond the end of the straight vaneless section and 0.250 inches axially from the fan hub surface 223'. The scroll 222 spirals outward, beginning at 0.250 inches radially from the diffuser 302 and ending at 1.500 inches radially from the same diffuser 305.

The ISAHDRB cowling 218 performs several functions. An integral fan shroud 216 is provided that protects the rotating fan 214 from foreign objects and also protects users from the rotating fan 214. In the case of a centrifugal-type fan embodiment, the fan shroud 216 completes the high velocity fan passages formed by the fan blades 221 and fan hub 223. It should be noted, however, that the fan shroud 216 is not required to be integral with the engine cowling 218. The fan shroud 216 can also be integral to the fan impeller. The engine cowling 218 also contains the scroll 222 for centrifugal-type fans. A portion of the scroll 222 or cowling 218 may be used to cool high power devices 224 mounted to a cold plate 226 that is an integral part of the engine cowling. The engine cowling 218 also directs the flow of air to the engine 212, including the engine head 201, the engine block 200, and the oil pan 202. In FIG. 2, the ISAHDRB 100 is mounted on one end of the internal combustion engine 212, whereas the power take off shaft 203 which is connected to a vehicle clutch and transmission is located on the other end of the engine 212.

For partial or total air cooled applications, cooling air is first directed to the ISAHDRB electrical components, which are typically required to be maintained at a lower temperature than the engine 212. The air cools the electronic cold plate assembly 226 and then the ISAHDRB stator 227. Electronic devices 224, such as active power converters, passive diode rectifiers, or other power and control electronics can be mounted as an assembly to the coldplate or otherwise in the air stream. Before or after cooling the critical electrical components, the air flow can be split into multiple flow paths to cool temperature sensitive components. The oil temperature must be maintained at a level, typically less than 240° F., the temperature at which most additives in the lubrication oil break down. This cooling can be provided via air or liquid cooling using an oil to coolant heat exchanger and a oil sump integral to the engine block or separate from the engine block.

The preferred ISAHDRB is a permanent magnet alternator configuration that can also be powered as a permanent magnet electric motor. Permanent magnet alternators and motors are generally considered to be the simplest, most efficient, and most reliable type of alternator and motors. There are no brushes, slip rings, or rotating fields, thereby eliminating wear components and reducing electro-magnetic interference emission. Permanent magnet alternators are typically classified as either axial gap or radial gap, referring the orientation of the airgap between the rotor and stator relative to the axis of rotation. Axial gap (also known as pancake or disc-type) alternators have the advantage of low cost and ease of manufacture. However, they are not generally considered for high power applications due to large eddy current losses and excessive heating at speeds above 1000 rpm. Axial gap alternators can be made with a relatively small radial dimension. For flywheel alternator applications, where the inertia of the flywheel is critical for engine operation, radial constraints are often secondary. Radial gap permanent magnet alternators can have either an interior or exterior rotor. Again, for applications where the inertia of the flywheel is necessary for engine operation, the exterior rotor is often preferred. This configuration places the largest amount of mass at the greatest radial distance from the crankshaft axis. The engine inertia can be increased (speed fluctuations reduced) for the same rotor mass. This configuration is preferred for this hybrid vehicle power source where weight is the primary design constraint.

Electrical power is generated by the motion of the permanent magnets (magnetic field) 233 passed the stator (stationary armature) 234. As the alternately oriented north and south magnetic pole pieces pass the stationary stator coils 235, they induce a voltage in the coils 235 first in one direction and then in the opposite direction in accordance with the type of pole. The frequency and magnitude of the alternator output voltage is directly related to the speed of the alternator rotor 405. For the flywheel alternator assembly 211, where the alternator rotor 405 is mounted on the engine crankshaft 213, the output voltage is also directly related to the rotational speed of the crankshaft 213. If the permanent magnets 233 pass the stator 234 faster, the voltage will alternate directions more quickly, leading to a higher frequency. The magnitude of the voltage induced in the stator coils 235 is dictated by Faraday's Law which states that the induced voltage is directly proportional to the rate of change of magnetic flux. This rate of change is again dictated by the speed with which the magnetic poles pass the coils 235. As this speed increases, so does the induced voltage. The applied load dictates the current. However, the magnetic field from the load current creates a counter-torque to the mechanical torque applied to the shaft. Therefore, as the load current increases, the rotational speed of the shaft is slightly reduced, and this in turn decreases the frequency and level of the output voltage.

The output power from the ISAHDRB is alternating current, typically multi-phase, and commonly at a frequency that is not acceptable to the end-user. Therefore, power conditioning is required. The simplest form of power conversion for output from a Permanent Magnet (PM) alternator is passive diode rectification through three-phase full-bridge rectifiers. This technique is best suited for constant load, constant engine speed operation, without voltage regulation and adjustment. However, this vehicle hybrid power application has highly variable engine speeds and requires active voltage regulation and adjustment for proper battery recharging, variable hybrid drive power (throttle adjustment) and motor starting. This can be accomplished through active rectification, and the methods are well known in the art. Alternatively an electric vehicle with diesel range extender, for which this ISAHDRB configuration is also ideally suited, would operate at a fixed rotational speed, greatly minimizing the size and complexity of the power conversion electronics.

Figure 8:
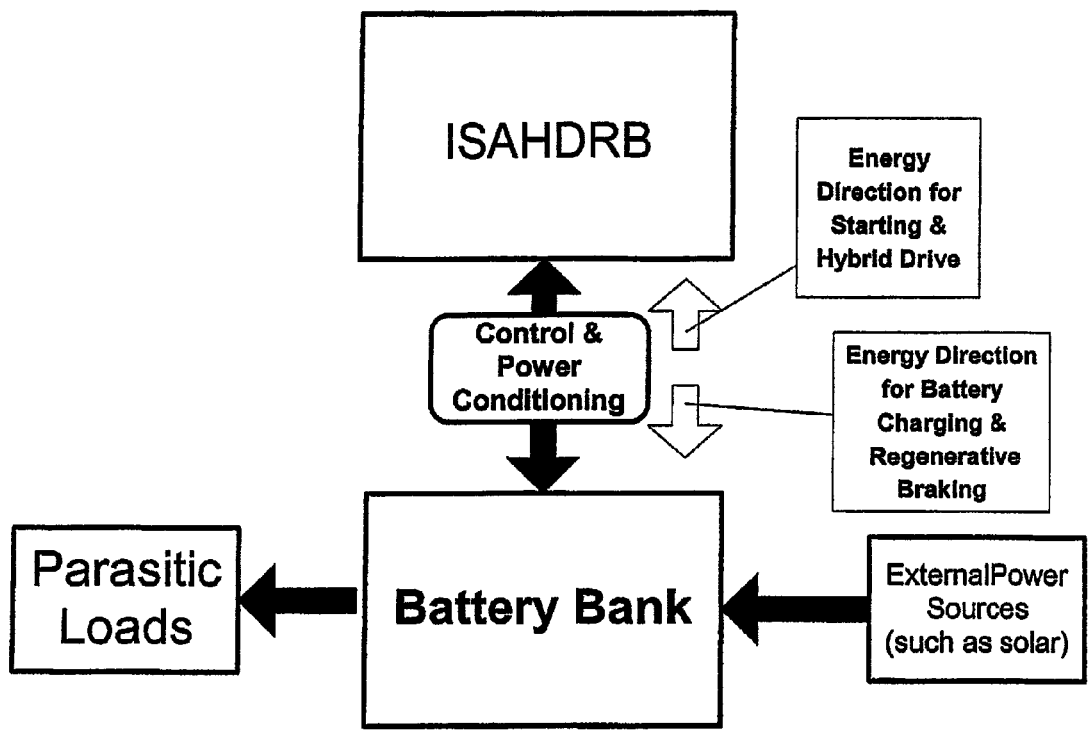
FIG. 8 is the Energy Flow Diagram for the ISAHDRB.

FIG. 8 shows the energy flow configuration of the ISAHDRB This configuration allows a single battery or battery bank to supply starting power, energy supply for parasitic loads, energy storage during regenerative braking and energy supply for acceleration. This configuration also allows the disconnection of parasitic loads, during periods of acceleration or motor starting, to allow fewer batteries in the battery bank, longer maximum acceleration periods, and longer engine cranking periods before depletion of the energy stored in the battery bank.

Figure 9:
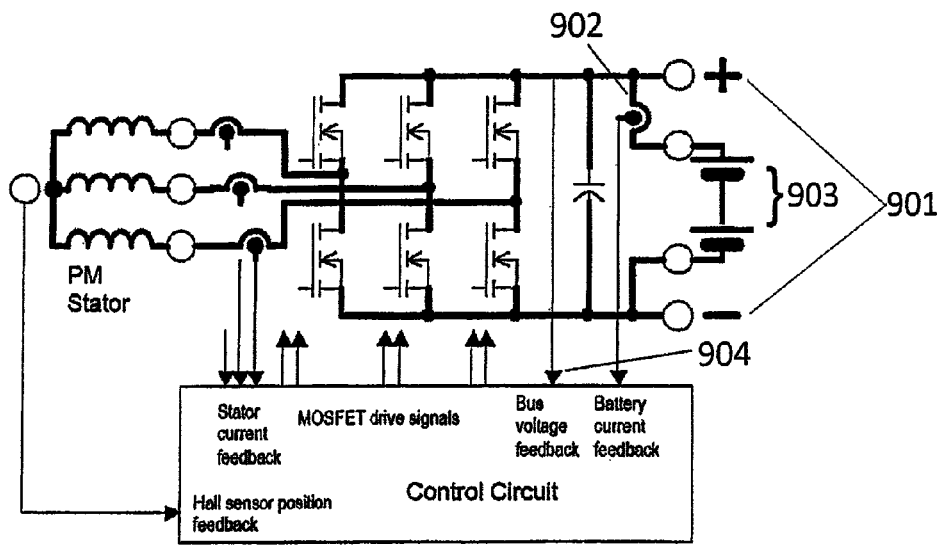
FIG. 9 is a typical wiring diagram for the ISAHDRB electronics. It allows the multiple use of the flywheel-ISAHDRB as a starter, an alternator, a hybrid drive and a regenerative brake.
Figure 10:
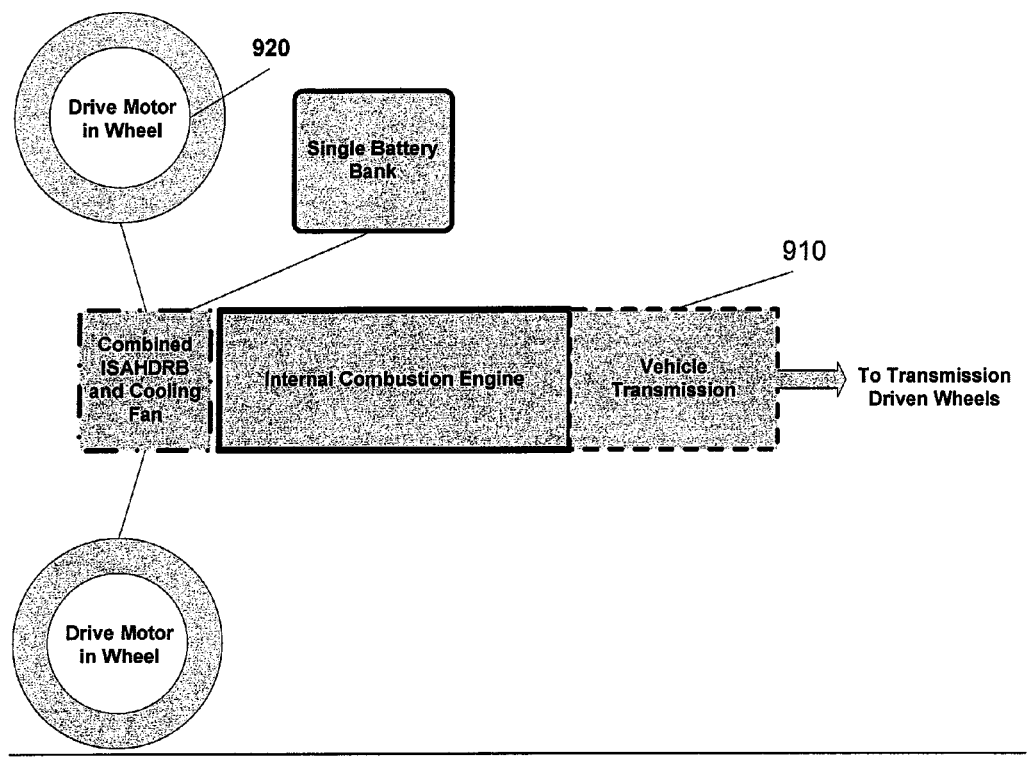
FIG. 10 is a overall component connectivity diagram of the ISAHDRB, Internal combustion engine, transmission and non-transmission-driven drive wheels.

As shown in FIG. 9 in which only one set of DC outputs 901 are shown (all loads are connected to these outputs), a current sensor 902 is located in the generator output circuit wiring between the ISAHDRB and the single battery bank 903. Parasitic vehicle loads are all wired in parallel to the battery terminals by connecting to the DC output 901. In this configuration current flow to recharge the battery bank as well as any power flowing to the loads (from the battery) will be detected by the current sensor 902. When the current flow diminishes to a negligible value, then the load is essentially zero and the battery or batteries are fully recharged.

The control logic also contains a voltage monitoring circuit 904, which when enabled will automatically start the engine when the battery terminal voltage drops below a present voltage level, to avoid completely draining the battery of power (and preventing the engine from being restarted).

In this configuration when the engine is operating to propel the vehicle and there is either a power demand or a low battery condition, then the throttle is increased (increased fuel injection) to maintain the same engine RPM while supplying power from the ISAHDRB to the battery terminals. If there is no external parasitic load, the engine throttle is not immediately reduced to only the vehicle's propulsion requirements, rather the electrical output is used to automatically recharge the batteries as needed. The battery bank is never fully recharged to allow regenerative braking capacity to be stored in the battery bank. As the battery bank charges, the current demand will decrease because the cell voltage increases as the battery's are charged. This current flow will be indicated by the current sensor. When this current diminishes to a negligible value, this indicates that there is no appreciable power demand, caused by either a load or a low battery, and therefore the ISAHDRB load on the engine will decrease and the throttle position (fuel injected) can be reduced to maintain the same engine speed, assuming the driver has not altered the gas peddle position.

If the driver attempts to slowly accelerate by slowly depressing the gas pedal, the engine throttle position will be increased accordingly (fuel injection increased) until the maximum throttle position is achieved. If the driver continuers to hold the gas pedal to the maximum position, then parasitic loads will be shut off, battery recharging will be halted and the ISAHDRB will provide electric motor power in addition to the engine power to increase the vehicle's acceleration. The period that both the internal combustion engine and hybrid electric motor can operate in parallel is determined by the energy storage capacity of the battery bank and the current charge state. The battery monitoring circuitry will terminate the electric drive motor automatically before battery power is drained below preset battery voltage values. One skilled in the art can readily determine the battery terminal voltage where the electric drive motor drive should be terminated, based on the battery type and battery bank capacity.

If the driver attempts to rapidly accelerate by immediately depressing the gas pedal, the engine throttle position will be increased to the maximum immediately (fuel injection increased to the maximum), parasitic loads will be shut off immediately, battery recharging if occurring will be halted immediately and the ISAHDRB will provide electric motor power in addition to the engine power to increase the vehicle's acceleration. Again, the period that both the internal combustion engine and hybrid electric motor can operate in parallel is determined by the energy storage capacity of the battery bank and the current sate of charge. The battery monitoring circuitry will terminate the electric drive motor automatically before battery power is drained below preset battery voltage values. One skilled in the art can also ready determine the battery terminal voltage where the electric drive motor drive should be terminated, based on the battery type and battery bank capacity.

If desired, for vehicles parked in extremely cold areas (which drain the battery of energy storage capacity because the batteries become too cold) or when the battery voltage drops due to long periods of inactivity, the voltage monitoring circuit arranged, across the poles of the battery bank can be used to determine when to automatically start the internal combustion engine to recharge the batteries. This automatic system if implemented would have to be manually set to avoid the engine from starting in enclosed areas, or an oxygen sensor could be used to turn the engine off if high exhaust concentrations were detected, indicating a confined space.

The currently preferred embodiment provides a hybrid electric motor assist to the internal combustion engine to provide short term acceleration boost. This hybrid configuration is not suited for applications where the vehicle is propelled on electric power alone unless the engine's cylinders are unloaded. One way of accomplishing this is to keep the exhaust valves open during the entire cycle and, of course, not injecting any fuel.

Since the required engine starting torque is much smaller than the capacity of the hybrid motor drive, the integrated approach assures that the starter's torque is well in excess of the cranking requirements, and thus the starter can be operated continuously without overheating or otherwise degrading the life of the ISAHDRB. This is a highly desirable feature, since in a typical automotive application the starter motor can only be cranked for short periods of time or may not be able to crank a extremely cold engine. Use of a traditional heavy-duty starter motor would alleviate this problem, but would add to the system weight and cost. In the ISAHDRB configuration, the starter motor adds no additional weight, since it is also the hybrid drive, the alternator, and the regenerative braking device. Therefore, the ISAHDRB has the additional benefit of proving much greater starting torque.

An ISAHDRB allows the PM alternator to be operated in reverse as a PM motor for starting the engine or providing the hybrid motor power boost from the single system battery bank. The AC-to-DC power conversion electronics are typically comprised of active rectifications circuits that are capable of regulating and adjusting the output voltage of the alternator function of the ISAHDRB and the DC-to-AC power conversion electronics are also comprised of active power inversion circuits that are capable of adjusting the frequency and voltage to the AC drive function of the ISAHDRB. Those skilled in the art will appreciate that the active power converters can be IGBTs, MOSFETS, or other active solid-state devices. However, if voltage regulation and adjustment is not required, (for example in the diesel range extender application, where the engine speed is constant) it is contemplated to use passive diode type rectifiers for the ac-to-dc power conversion with active power devices for the dc-to-ac power conversion for motor starting and hybrid power drive.

The electric starting requires a power source, such as a DC battery bank to provide electrical power to the ISAHDRB during engine starting or hybrid electric power boost. In the present invention, only one battery bank need be present in the system. This singular battery bank (which can be one or more batteries and ultracapacitors connected in parallel or in series to obtain the desired operating voltage) supplies energy for motor starting and hybrid power as well as being the energy sink for regenerative braking and battery recharging all done by the single flywheel integrated ISAHDRB device. One skilled in the art will also recognize that the singular battery bank can also be recharged by other electrical power sources including solar power, stationary power (when parked) and the like.

One skilled in the art will also recognize that the greater the voltage in the battery bank, the lesser the current for a given power demand, and that different battery bank terminal voltages can be obtained by different combinations of the number of batteries connected in series. Likewise, any type of suitable rechargeable battery can be used in this application.

One skilled in the art will further recognize that this engine hybrid concept can be extended to load-leveling applications, where the engine supplies the average vehicular propulsion demand, and the battery bank is used to average out the power demands (providing additional boost power from the battery bank for periods of high acceleration and restoring this energy back into the battery bank, during periods of light engine load). This approach will lower the overall size of the engine and allow the engine to operate at optimum condition (peak fuel efficiency) for a greater percentage of the operating period, thereby improving overall efficiency, reducing fuel consumption, and reducing combustion wet stacking problems (in diesel engine systems). In such a configuration, the engine operates at the optimum (most efficient) power setting for a greater portion of the overall operating time. It will be also readily appreciated now that using the disclosed hybrid drive configuration for additional vehicle acceleration will reduce the size of the internal combustion engine needed, and that the exact size of the required engine is a function of the vehicle weight, vehicle drag, overall battery bank capacity and desired vehicle performance capabilities.

The basic concept is that the DC output of the ISAHDRB when generating DC power during regenerative braking, the DC input to the ISAHDRB when providing hybrid electric motor boost drive power, the DC output of the ISAHDRB when using the engine to recharge the battery bank, and the DC input to ISAHDRB when starting the engine, and the DC input to parasitic loads all are provided by the same and only battery bank on the vehicle.

The ISAHDRB, the battery bank and the parasitic loads are all connected in parallel. That is the energy flows from the ISAHDRB to the battery when the engine is running and providing excess power to charge the battery and during regenerative braking. The energy flows in the opposite direction through the same wiring, from the battery to the ISAHDRB during engine starting, and hybrid power boost to provide maximum vehicle acceleration. With this configuration, when the vehicle's acceleration power requirements exceeds the engine output capacity, the ISAHDRB provides additional shaft power (at the flywheel) and through the engine drawing the necessary electrical power from the battery bank. The actual period that this electrical boost power is available depends on the battery bank energy capacity, condition of the battery, and the state of charge and can be calculated by one well versed in the art. Battery terminal voltage can be monitored to automatically interrupt this hybrid drive motor boost power (supplied by the ISAHDRB), before the battery bank is exhausted.

This is a substantial departure from the typical electric starting system for engines where the battery is used to start the engine, via a relay or starter solenoid which temporarily connects the starter motor battery to the motor starter during starting then disconnects the circuit after the motor starts. In the typical known configuration, the battery used by the engine starter is not connected directly to batteries used for hybrid vehicle drive power or regenerative braking, in fact they typically even operate the different batteries (or battery banks) operate at different voltages. The output of the engine's alternator (or generator) is used to recharge the starting battery via a separate voltage regulation/charging circuit.

The battery connected to the ISAHDRB is recharged by the ISAHDRB automatically after the starting surge or hybrid drive surge (acceleration demand) is over. If all loads turn off or turn down significantly, the engine will continue to operate, re-charging the batteries as necessary. When the current output from the ISAHDRB drops below a certain threshold (meaning the battery is almost fully charged), and the other loads are small, the engine will throttle down to maintain the same engine RPM without any additional power generator loads on the engine. After the engine throttles down, the system monitors the battery charge and parasitic loads to determine when to increase the throttle; that is, the engine throttle does not automatically increase every time a load is applied to the system. Power is supplied by the battery first if possible. This avoids the problem of an engine continually changing throttle setting when there is only a very small change in the load being powered. In such a case, with this system, the necessary power will be supplied from the singular battery bank, with the engine throttle only changing as needed to recharge the battery or supply the short fall acceleration required by the driver's gas peddle position. When the vehicle's gas pedal is at the maximum position (all the way to the floor) the engine throttle will be at the maximum and the ISAHDRB will also be providing maximum electrical motor supplement.

This is only one possible control configuration for allowing transient surge capability, minimizing excessive engine throttling changes, and minimizing engine operation at non-optimum conditions. More traditional means to determine when engine throttle changes should be made can of course also be utilized. Direct acting manual throttle changes, reflected in the gas pedal position directly, can of course also be used.

The permanent magnets 233 are preferably made from high power density materials such a samarium cobalt (SmCo) or neodymium-iron-boron (NdFeB), although any permanent magnet material can be used. The magnets 233 must be maintained at a temperature low enough to prevent demagnetization of the magnets. $Sm_2Co_{17}$ is used in the currently preferred embodiment due to relatively high maximum working temperature and superior corrosion resistance properties when compared to other high power density permanent magnets. The magnet reversible temperature coefficient of magnetization of $Sm_2Co_{17}$ in the currently preferred embodiment does not exceed $-0.035\%$ per $^\circ$ C. over a range from 25° C. to 250° C.

For high power and high efficiency operation of the ISAHDRB the permanent magnets must be mounted in a magnetic material (forming a magnetic ring of material), such as AISI 1215 or AISI 1018 steel. The magnetic ring 406 must have a cross sectional area large enough to carry the magnetic flux of the alternator. That is, the magnetic flux density in the magnetic ring 406 must not exceed the saturation flux density of the material at maximum operating conditions. The cross sectional area of the magnetic ring 406 must also be great enough to handle the stress (hoop stress) created by rotation and must be large enough so that when combined with the other rotating components (e.g., components 214, 220, 221, 223, 233, 237 and 238 of FIG. 2) of the ISAHDRB 211 creates sufficient inertia so as to minimize speed fluctuations. In order to maximize power output, the permanent magnets 233 should be mounted to the magnetic ring 406 with alternating pole directions and the magnetic ring manufactured from magnetic material sized to carry the worst case magnetic flux of the alternator, regenerative braking, motor starter and hybrid power functions of the ISAHDRD. Other configurations with permanent magnets mounted in uniform pole directions and/or mounted in a rotor fabricated from a non-magnetic material are possible. These configurations would be limited to low power input and low power output as typically used to create a spark for spark ignition type internal combustion engines or to power auxiliary equipment. These types of magnetos should not be confused with the disclosed invention wherein large quantities of power must be generated. The efficiency of the currently preferred embodiment is required so that excessive waste heat is not generated. If excessive amounts of waste heat are generated in power generation equipment, then the size and weight of the cooling system become large and lightweight compact hybrid vehicular drive system is less practical. Yet another advantage of locating the ISAHDRB system on the fan end of the engine (and not on the transmission end) is that improved cooling is practical.

The permanent magnets 233 can be mounted to the magnetic ring 406 through bonding, clipping, or any conventional method. In order to minimize the rotor mass while maximizing the rotor inertia, the components with the densest material are placed at the greatest radial distance from the crankshaft axis of rotation 408. Components that are not at relatively large radial distances contribute very little to the flywheel inertia. Therefore, these components should be made as light as possible. Therefore, the flywheel spokes, fan hub 223', and fan blades 221' are fabricated from a different material than the magnetic ring 406. In the currently preferred embodiment, these components are fabricated from a lightweight alloy such as aluminum, titanium, or magnesium. The cross-sectional area of the spokes must be sufficient to handle stresses created by the rotation of ISAHDRB, magnetic forces imposed by the ISAHDRB, and torque transmitted from the mounting portion of the flywheel to the inertia portion of the flywheel. In the currently preferred embodiment the flywheel contains a counterbore 409 to concentrically locate the ISAHDRB hub 406 with respect to the flywheel and to maintain a uniform radial airgap circumferentially about the ISAHDRB stator 234. Fasteners such as bolts 306 or clips are used to retain the magnetic ring 406 within the flywheel counterbore 409. Alternator magnetic ring drive members 411 and flywheel drive members 412 are formed to transmit torque without relying on the fasteners 306 whose function is merely act to prevent axial movement.

Referring again to the schematic wiring diagram of a currently preferred embodiment of the ISAHDRB and voltage regulation electronics shown in FIG. 9, the ISAHDRB flywheel has twelve alternating polarity $Sm_5Co$ magnets generate the magnetic field. A single circuit 801 comprising a three-phase way connected winding coil 802 is installed in seventy-two slots 803. Alternating current and voltage are produced with an amplitude and frequency proportional to the speed of the alternator. In the previously described configuration, with a rotational speed of 3600 rpm, the twelve-pole alternator produces a frequency of 360 Hz. This configuration was selected to improve ripple and output harmonics for rectified dc power generation. However, one skilled in the art will understand the tradeoffs associated with the number of poles of the electromagnetic device.

Active rectification is used to convert alternating current into direct current. MOSFETS 804 in the circuit of FIG. 9 produce waste heat that must be removed to maintain junction temperature below a prescribed temperature, typically 150° C. If heat is not removed, the device life will be reduced significantly, ultimately ending in device failure. Prepackaged MOSFETS can be employed to reduce assembly cost. The waste heat generated in a package MOSFET is typically removed from the base. Heat can be removed by forced convection created by the ISAHDRB fan.

A single fan is used to cool the engine, the engine lubricating oil, the ISAHDRB, and the power converters and/or other electronics by direct force air cooling. Alternatively, the single fan integral to the flywheel can be used to force air across and cool a liquid heat exchanger (radiator) and the secondary coolant in the heat exchanger is then pumped to the engine, the engine lubricating oil, the alternator, and the power converters or other electronics to provide liquid cooling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle power device for an internal combustion engine operatively connected to a transmission, via a crankshaft on a transmission-facing side of the engine, the device comprising an integrated unit that includes a hybrid electric motor, engine starter, electromagnetic regenerative braking device and battery-charging alternator located on a side of the engine axially opposite the transmission-facing side as viewed in an axial direction along the crankshaft, wherein the integrated unit has a rotating assembly integrated with a rotating flywheel and a stationary portion adjacent the flywheel.

2. The hybrid vehicle power device of claim 1, wherein the rotating assembly is configured to act as a cooling fan to supply forced air for cooling at least one of a radiator, oil cooler, the integrated unit, system control electronics, and the internal combustion engine, or to ventilate an engine compartment.

3. The hybrid vehicle power device of claim 1, where the rotating assembly is configured to create a magnetic field and constitute a rotating portion of the electric motor, electric brake or electric generator.

4. The hybrid vehicle power device of claim 3, wherein the rotating assembly has permanent magnets and adjacent magnetic material affixed to a flywheel.

5. The hybrid vehicle power device of claim 1, wherein the integrated unit is sized and configured to produce rotating shaft power for propelling a vehicle and electrical power selectively providing power for vehicle parasitic devices, vehicle electric drive, and for being stored in a single battery bank.

6. The hybrid vehicle power device of claim 1, wherein the integrated unit is configured to utilize a DC power source to provide engine starting power and supplemental output power.

7. The hybrid vehicle power device of claim 1, wherein the integrated unit is configured to be powered from a singular battery bank to act as an electric starter motor for the engine and a hybrid electric drive motor.

8. The hybrid vehicle power device of claim 1, wherein the integrated unit is configured to supply power to a single battery bank as an energy sink for regenerative braking and to recharge the single battery bank.

9. The hybrid vehicle power device of claim 1, wherein the integrated unit further includes cooling fan blades attached to a flywheel.

10. The hybrid vehicle power device of claim 1, wherein the integrated unit is arranged to function as a motor or generator rotating portion and at least one of force cooling air to a radiator of the engine configured as a liquid cooled engine, ventilate an engine compartment, cool the engine oil and cool other vehicle components.

11. The hybrid vehicle power device of claim 1, wherein the integrated unit is configured as a radial gap, electromagnetic device.

12. The hybrid vehicle power device of claim 1, wherein a stationary portion of the integrated unit constitutes a stator portion of an electric motor, electric brake or electric generator.

13. The hybrid vehicle power device of claim 12, wherein the stationary portion is configured to induce a current during alternator and regenerative braking operations.

14. The hybrid vehicle power device of claim 12, wherein the stationary portion is arranged to be supplied with current during motor starting and hybrid drive motor operation.

15. The hybrid vehicle power device of claim 1, wherein the integrated unit is operatively connected to a single battery bank for powering vehicle parasitic loads as well as for engine starting and hybrid drive motor power, and to an energy sink for battery recharging and regenerative braking.

16. The hybrid vehicle power device of claim 15, wherein the single battery bank is comprised of at least one battery or ultracapacitor sized to provide needed hybrid drive power surge capacity, motor starting capacity, and regenerative braking energy storage capacity.

17. The hybrid vehicle power device of claim 15, wherein at least one actively controlled DC-AC converter is operatively associated with a battery supply for converting direct current into alternating current used by the integrated unit during motor.

18. The hybrid vehicle power device of claim 15, wherein the integrated unit and parasitic devices are wired to common positive and negative terminals of the single battery bank.

19. The hybrid vehicle power device of claim 15, wherein the engine is configured to be automatically started when the battery voltage drops below a predetermined value.

20. The hybrid vehicle power device of claim 15, wherein an external electrical power source is used to recharge the single battery bank.

21. The hybrid vehicle power device of claim 20, wherein the external electrical power is obtained from at least one of solar panels, inertial energy recovery devices, and wind power energy recovery devices incorporated into the vehicle.

22. The hybrid vehicle power device of claim 15, wherein the single battery bank is so configured that battery recharging is automatically terminated when parasitic loads are absent and the current flow at a terminal of the single battery bank drops below a predetermined value.

23. The hybrid vehicle power device of claim 15, wherein at least one parasitic load is disconnected from the single battery bank upon activation of a hybrid electric drive.

24. The hybrid vehicle power device of claim 1, wherein a cowling is associated with the integrated unit to function as at least two of a fan shroud, a fan scroll, an air distributor to cool the engine and the rotating and stationary portions of an electromagnetic motor/alternator in an area on and around the flywheel, an air cooled electronic cold plate, and at least one air coolant duct.

25. The hybrid vehicle power device of claim 24, wherein the cowling when providing the air distributor function is operative to separate air flow for cooling at least one engine part, other components in the vehicle, electronics, the single battery bank, and the engine oil or to ventilate the engine compartment.

26. The hybrid vehicle power device of claim 24, wherein the cowling when providing the air distributor function provides forced air flow to cool at least one of portions of the engine, a liquid cooled engine radiator, other vehicle components, vehicle electronics, a battery bank, and engine oil.

27. The hybrid vehicle power device of claim 1, wherein the rotating assembly provides a mechanical link between an inertial-electromagnetic component and a mounting portion of the flywheel.

28. The hybrid vehicle power device of claim 27, wherein fan blades of the rotating assembly mechanically connect a shaft attachment portion hub thereof with inertial and electromagnetic components at the radially outward locations of the flywheel.

29. The hybrid vehicle power device of claim 27, wherein the mechanical link is comprised of a lightweight alloy and the inertial-electromagnetic component is comprised of a plurality of magnets attached to magnetic material of an alternator rotor to provide both a primary inertial component and a magnetic field required for the electromagnetic effect of the motor or generator.

30. The hybrid vehicle power device of claim 1, wherein the integrated unit is configured to operate as a starter motor during engine starting.

31. The hybrid vehicle power device of claim 30, wherein at least one actively controlled DC-AC converter is operatively associated with a single battery bank for converting direct current into alternating current for engine starting.

32. The hybrid vehicle power device of claim 1, wherein the integrated unit is configured to operate as a hybrid electric motor drive selectively to increase engine output and to increase vehicle acceleration when the engine is already operating.

33. The hybrid vehicle power device of claim 32, wherein at least one actively controlled DC-AC converter is operatively associated with a single battery bank for converting direct current into alternating current to power the hybrid electric motor drive.

34. The hybrid vehicle power device of claim 1, wherein the integrated unit is configured to operate as a battery recharging alternator when the engine is operating and maximum acceleration is not required.

35. The hybrid vehicle power device of claim 34, wherein at least one actively controlled AC-DC converter is operatively associated with the integrated unit for converting alternating current to DC power for input into a single battery bank.

36. The hybrid vehicle power device of claim 1, wherein the integrated unit is configured to operate as a regenerative vehicle braking system by adding electromagnetic drag to the engine via a flywheel to decelerate the vehicle.

37. The hybrid vehicle power device of claim 36, further comprising means for converting alternating current from regenerative braking to direct current power and activating at least one parasitic device as a load when battery storage capacity is unavailable.

38. The hybrid vehicle power device of claim 36, wherein at least one actively controlled AC-DC converter is operatively associated with the integrated unit for converting alternating current from regenerative braking to DC power for input into a singular battery bank when battery storage capacity is available.

39. The hybrid vehicle power device of claim 33, wherein the single battery bank is sized to provide necessary transient power required for a hybrid electric boost to accelerate the vehicle.

40. The hybrid vehicle power device of claim 39, wherein the hybrid electric boost is configured to automatically terminate when battery voltage drops below a predetermined value.

41. The hybrid vehicle power device of claim 1, wherein the integrated unit is configured so as to be selectively connectable to drive wheels other than transmission-driven wheels to provide drive power or regenerative braking.

42. The hybrid vehicle power device of claim 1, wherein electrical output from the integrated unit is used to power electric drive motors to drive wheels other than transmission driven wheels.

43. The hybrid vehicle power device of claim 1, wherein electrical output from regenerative braking of the electric drive motors associated with drive wheels other than transmission driven wheels is returned to the single battery bank.

44. A vehicle, comprising an engine, a transmission operatively connected to the engine via a crankshaft on a transmission-facing side thereof, and a hybrid vehicle power device located on a side of the engine axially opposite the transmission-facing side as viewed in an axial direction of the crankshaft and comprised of an integrated unit having a hybrid electric motor, engine starter, electromagnetic regenerative braking device, battery-charging alternator, and a rotating assembly integrated with a rotating flywheel and a stationary portion adjacent the flywheel.

* * * * *